(12) United States Patent
Schmidbauer

(10) Patent No.: US 10,208,725 B2
(45) Date of Patent: Feb. 19, 2019

(54) HIGH PRESSURE FUEL PUMP AND ASSOCIATED DRIVE DEVICE

(71) Applicant: Continental Automotive GmbH, Hannover (DE)

(72) Inventor: Thomas Schmidbauer, Falkenstein (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 385 days.

(21) Appl. No.: 15/119,184

(22) PCT Filed: Oct. 7, 2015

(86) PCT No.: PCT/EP2015/073113
§ 371 (c)(1),
(2) Date: Aug. 16, 2016

(87) PCT Pub. No.: WO2016/058877
PCT Pub. Date: Apr. 21, 2016

(65) Prior Publication Data
US 2017/0009720 A1    Jan. 12, 2017

(30) Foreign Application Priority Data
Oct. 15, 2014   (DE) .................. 10 2014 220 937

(51) Int. Cl.
*F02M 59/10*       (2006.01)
*F02M 59/06*       (2006.01)
(Continued)

(52) U.S. Cl.
CPC .......... *F02M 59/102* (2013.01); *F02M 59/06* (2013.01); *F04B 9/045* (2013.01); *F16H 21/18* (2013.01); *F02M 2200/02* (2013.01)

(58) Field of Classification Search
CPC .... F02M 37/043; F02M 59/102; F02M 59/44; F04B 9/045; F16H 21/32
See application file for complete search history.

(56) References Cited

U.S. PATENT DOCUMENTS

| | | | |
|---|---|---|---|
| 1,797,781 A | 3/1931 | Mccaughey | 92/254 |
| 2,179,354 A | 11/1939 | Lane | 126/496 |

(Continued)

FOREIGN PATENT DOCUMENTS

| | | | |
|---|---|---|---|
| DE | 960776 C | 3/1957 | F04B 53/14 |
| DE | 19858862 A1 | 3/2000 | F02M 59/06 |

(Continued)

OTHER PUBLICATIONS

Japanese Office Action, Application No. 2016557651, 2 pages, dated May 14, 2018.

(Continued)

*Primary Examiner* — Erick R Solis
*Assistant Examiner* — Anthony L Bacon
(74) *Attorney, Agent, or Firm* — Slayden Grubert Beard PLLC

(57) ABSTRACT

The present disclosure relates to internal combustion engines in general. Some embodiments may include a drive device for a high-pressure fuel pump of an internal combustion engine. It may include an eccentric ring in frictional connection with a drive shaft for converting a rotational movement of the drive shaft about a drive shaft rotational axis into a translational movement; a tappet spaced apart from the eccentric ring for passing on the translational movement from the eccentric ring; and at least two pivoting bodies disposed between the eccentric ring surface and the tappet surface and in contact with the eccentric ring surface and with the tappet surface. The eccentric ring may include at least one flat eccentric ring surface. The tappet may (Continued)

include at least one flat tappet surface. The pivoting bodies may each include a respective extension axis running parallel to the drive shaft rotational axis and pivot about the extension axis.

10 Claims, 3 Drawing Sheets

(51) Int. Cl.
*F04B 9/04* (2006.01)
*F16H 21/18* (2006.01)

(56) References Cited

U.S. PATENT DOCUMENTS

| | | | | |
|---|---|---|---|---|
| 2,948,159 | A | 8/1960 | Wirsching | 74/55 |
| 4,197,787 | A | 4/1980 | Schneider | 92/129 |
| 4,204,814 | A | 5/1980 | Matzen | 417/437 |
| 4,955,284 | A | 9/1990 | Faulkner | 92/248 |
| 5,957,674 | A | 9/1999 | Zenmei et al. | 417/505 |
| 6,244,832 | B1* | 6/2001 | Guentert | F04B 1/0408 417/269 |
| 6,530,363 | B1 | 3/2003 | Blass et al. | 123/446 |
| 6,991,438 | B2 | 1/2006 | Blessing et al. | 417/273 |
| 7,156,079 | B2 | 1/2007 | Kamiyama et al. | 123/508 |
| 7,350,505 | B2 | 4/2008 | Felton | 123/446 |
| 8,863,716 | B2 | 10/2014 | Dorn et al. | 123/90.5 |
| 9,297,376 | B2 | 3/2016 | Sakoh et al. | |
| 9,422,834 | B2 | 8/2016 | Fujii et al. | |
| 9,441,722 | B2 | 9/2016 | Berruet et al. | |
| 9,664,266 | B2 | 5/2017 | Hauvespre et al. | |
| 2002/0081215 | A1* | 6/2002 | Plaga | F04B 1/0426 417/273 |
| 2004/0025684 | A1 | 2/2004 | Djordjevic | 92/129 |
| 2004/0096337 | A1* | 5/2004 | Kuhn | F04B 1/0426 417/273 |
| 2006/0016406 | A1 | 1/2006 | Geyer | 123/90.5 |
| 2006/0093490 | A1* | 5/2006 | Kleinbeck | F02M 59/102 417/273 |
| 2006/0110273 | A1 | 5/2006 | Shaull et al. | 417/470 |
| 2007/0273105 | A1 | 11/2007 | Stanton et al. | 277/500 |
| 2007/0277785 | A1* | 12/2007 | Portner | F02M 55/025 123/456 |
| 2008/0031744 | A1* | 2/2008 | Boehland | F02M 59/102 417/271 |
| 2010/0294219 | A1 | 11/2010 | Prokop | 123/90.5 |
| 2011/0088506 | A1 | 4/2011 | Oishi et al. | 74/569 |
| 2011/0116945 | A1 | 5/2011 | Shibata | 417/364 |
| 2012/0152187 | A1 | 6/2012 | Cornett et al. | 123/90.5 |
| 2012/0294741 | A1 | 11/2012 | Nishimura et al. | 417/437 |
| 2013/0206110 | A1 | 8/2013 | Rosu | 123/456 |
| 2014/0255227 | A1 | 9/2014 | Greiner | 417/471 |
| 2015/0082938 | A1 | 3/2015 | Schick | 74/569 |
| 2015/0233332 | A1 | 8/2015 | Hashida et al. | 417/364 |
| 2015/0247480 | A1 | 9/2015 | Wirkowski et al. | 123/508 |
| 2015/0369097 | A1 | 12/2015 | Hauvespre et al. | 74/559 |
| 2016/0108875 | A1 | 4/2016 | Lamm et al. | 417/364 |
| 2017/0260947 | A1 | 9/2017 | Graspeuntner | |

FOREIGN PATENT DOCUMENTS

| | | | | |
|---|---|---|---|---|
| DE | 102010026360 | A1 | 1/2012 | F01L 1/14 |
| EP | 1347172 | A2 | 9/2003 | F04B 1/04 |
| EP | 2628942 | A1 | 8/2013 | F02M 59/10 |
| EP | 2677124 | A1 | 12/2013 | F01L 1/14 |
| GB | 881430 | A | 11/1961 | F04B 1/02 |
| JP | 4060167 | U | 5/1992 | A47L 25/00 |
| JP | 0612703 | U | 2/1994 | F01L 1/14 |
| JP | 6200714 | A | 7/1994 | F01L 1/14 |
| JP | 11050818 | A | 2/1999 | F01L 1/14 |
| JP | 2001221131 | A | 8/2001 | F02M 59/10 |
| JP | 2004270641 | A | 9/2004 | F02M 39/02 |
| JP | 2008045441 | A | 2/2008 | F02M 59/10 |
| JP | 2010112193 | A | 5/2010 | F02M 59/10 |
| JP | 2011231652 | A | 11/2011 | F02M 59/10 |
| KR | 20120029667 | A | 3/2012 | F02M 59/10 |
| WO | 2016/058877 | A1 | 4/1916 | F02M 59/06 |
| WO | 2016/058878 | A1 | 4/1916 | F01L 1/14 |
| WO | 2008/012295 | A2 | 1/2008 | F02M 59/06 |
| WO | 2012/082768 | A1 | 6/2012 | F01L 1/14 |
| WO | 2013/119214 | A1 | 8/2013 | F01L 1/14 |

OTHER PUBLICATIONS

Chinese Office Action, Application No. 201580017959.9, 17 pages, dated May 30, 2018.
Japanese Office Action, Application No. 2016557651, 5 pages, dated Sep. 25, 2017.
U.S. Non-Final Office Action, U.S. Appl. No. 15/119,165, 22 pages, dated Nov. 3, 2017.
Japanese Office Action, Application No. 2016555610, 5 pages, dated Sep. 19, 2017.
Korean Office Action, Application No. 20167025925, 16 pages, dated Jan. 5, 2018.
U.S. Final Office Action, U.S. Appl. No. 15/119,165, 23 pages, dated Apr. 18, 2018.
U.S. Advisory Action, U.S. Appl. No. 15/119,165, 3 pages, dated Jul. 6, 2018.
Korean Notice of Allowance, Application No. 2018038655721, 3 pages, dated Jun. 7, 2018.
German Office Action, Application No. 102014220839.4, 4 pages, dated Oct. 1, 2015.
German Office Action, Application No. 102014220937.4, 11 pages, dated Oct. 8, 2015.
International Search Report and Written Opinion, Application No. PCT/EP2015/073114, 14 pages, dated Dec. 17, 2015.
International Search Report and Written Opinion, Application No. PCT/EP2015/073113, 14 pages, dated Jan. 4, 2016.

* cited by examiner

HIGH PRESSURE FUEL PUMP AND ASSOCIATED DRIVE DEVICE

CROSS-REFERENCE TO RELATED APPLICATIONS

This application is a U.S. National Stage Application of International Application No. PCT/EP2015/073113 filed Oct. 7, 2015, which designates the United States of America, and claims priority to DE Application No. 10 2014 220 937.4 filed Oct. 15, 2014, the contents of which are hereby incorporated by reference in their entirety.

TECHNICAL FIELD

The present disclosure relates to internal combustion engines in general. Some embodiments of the teaching may describe a drive device for driving a high-pressure fuel pump of an internal combustion engine and a high-pressure fuel pump which has such a drive device.

BACKGROUND

High-pressure fuel pumps which highly pressurize a fuel supplied to a combustion chamber of an internal combustion engine are usually formed as piston pumps. In such pumps, a piston compresses a fuel in a pressure chamber by means of a translational movement and thus highly pressurizes it. For example, typical high-pressure fuel pumps in petrol internal combustion engines pressurize the fuel to a pressure between 200 bar and 250 bar, while high-pressure fuel pumps in diesel internal combustion engines pressurize the fuel to a pressure between 2000 bar and 2500 bar.

In order to drive the piston in its translational movement, a camshaft is commonly used as a drive shaft which rotates about a drive shaft rotational axis so that a cam projecting beyond the drive shaft periodically pushes the piston away from the drive shaft rotational axis. The volume of the pressure chamber, in which the fuel is located, is reduced and the fuel is thus pressurized. In the case of a further rotation of the drive shaft, the piston then moves again in the direction of the drive shaft rotational axis, as a result of which the volume of the pressure chamber is increased again.

There are various approaches for transmission of the translational movement from the drive shaft to the piston. One example is an eccentric ring, what is known as a rider, often used in contact with the drive shaft such that the drive shaft rotates away together with the cam under the eccentric ring, while the eccentric ring is moved up and down in a translational direction without itself rotating. The eccentric ring has a flat surface which is in operative contact with the piston, and indeed usually via a sliding shoe which slides over the flat surface of the eccentric ring and thus transmits the movement of the eccentric ring to the piston.

Such an arrangement is shown in FIG. 3 and FIG. 4. FIG. 3 is a longitudinal sectional view through a high-pressure fuel pump 10 according to the prior art, while FIG. 4 shows a sectional view through high-pressure fuel pump 10 from FIG. 3 along line IV-IV.

High-pressure fuel pump 10 includes two pistons 12 which are opposite one another and delimit in each case a pressure chamber 14 on one side. Pressure chambers 14 are fed in each case via an intake 16, in which a first valve 18 is arranged, with a fuel which is highly pressurized by translational movement of piston 12. The highly pressurized fuel is then conducted in each case via an outlet 20, in which a second valve 22 is arranged, to a combustion chamber. Pistons 12 are driven by a drive shaft 24 which rotates about a drive shaft rotational axis 26. In order to be able to perform the piston stroke, the mechanical energy is transmitted in the form of rotational energy, i.e., a torque, into a translational movement of piston 12 by virtue of the fact that what is known as an eccentric drive 28 is interconnected between drive shaft 24 and piston 12.

Eccentric drive 28 has an eccentric ring 30 under which drive shaft 24 and a cam 34 arranged thereon rotate away. Eccentric ring 30 is periodically guided away in the direction of pressure chamber 14 and away from it without, however, itself rotating. A center point M of eccentric ring 30 is spaced apart by a distance A from rotational axis 26 or shaft center point W. With the rotation about W and eccentricity A=$\overline{MW}$, a stroke of 2·$\overline{MW}$ is produced.

Eccentric drive 28 further has a sliding shoe 36 which slides on a flat eccentric ring surface 38 during the movement of eccentric ring 30 and passes on the translational movement of eccentric ring 30 to piston 12.

So that piston 12 and sliding shoe 36 are continuously in contact with eccentric ring surface 38, a spring 40 is provided which pretensions piston 12 and sliding shoe 36 onto eccentric ring surface 38.

Alternatively to eccentric drive 28 shown in FIG. 3 and FIG. 4, there are also arrangements in which, for example, a roller tappet rolls with a roller directly on cam 34 of drive shaft 24 and thus transmits the translational movement to piston 12. The advantage of these arrangements with a roller tappet is that in comparison with an eccentric drive 28 instead of sliding friction between eccentric ring 30 and sliding shoe 36 a significantly lower rolling friction is present between cam 34 and a roller of the roller tappet.

Roller tappets therefore have the advantage that lower friction is present between the individual elements of a drive region, but they are less robust than eccentric drives. Such eccentric drives can namely, for example, also be used in combination with connecting rods in an internal combustion engine which tends to be difficult when using roller tappets.

SUMMARY

The object of the present disclosure is to describe an eccentric drive of a high-pressure fuel pump in light of friction problems with the prior art.

In some embodiments of the teachings of the present disclosure, a drive device (42) for driving a high-pressure fuel pump (10) of an internal combustion engine may include: an eccentric ring (30) which is in frictional connection with a drive shaft (24) for converting a rotational movement of the drive shaft (24) about a drive shaft rotational axis (26) into a translational movement, wherein the eccentric ring (30) has at least one flat eccentric ring surface (38); a tappet (44) arranged spaced apart from the eccentric ring (30) for passing on the translational movement from the eccentric ring (30), wherein the tappet (44) has at least one flat tappet surface (50); at least two pivoting bodies (46) which are arranged between the eccentric ring surface (38) and the tappet surface (50) and are in contact with the eccentric ring surface (38) and with the tappet surface (50). The pivoting bodies (46) have in each case an extension axis (56) running parallel to the drive shaft rotational axis (26), wherein the pivoting bodies (46) are formed for pivoting about the extension axis (56).

In some embodiments, the pivoting bodies (46) have in each case a first contact surface (48) in contact with the tappet surface (50) and in each case a second contact surface

(54) in contact with the eccentric ring surface (38), wherein the first and/or the second contact surface (54) is formed to be arched about the extension axis (56).

In some embodiments, the first and/or the second contact surface (48, 54) is formed to be convexly arched about the extension axis (56), wherein in particular a curvature of the first and the second contact surface (48, 54) is identical.

In some embodiments, the pivoting bodies (46) have in each case at least one lateral surface (66) arranged substantially perpendicular to the eccentric ring surface (38) and the tappet surface (50), which lateral surface (66) is formed to be flat or with a constriction or concavely or convexly, wherein the convexly formed lateral surface (66) has in particular a different curvature to the convexly formed first or second contact surface (48, 54).

In some embodiments, the pivoting bodies (46) are formed in an elongated manner along an axis (70) of the translational movement, wherein in particular a length (L) of the pivoting bodies (46) along the axis (70) of the translational movement lies in a range from 7 mm to 20 mm, in particular 14 mm to 18 mm.

In some embodiments, the tappet (44) is a bucket tappet (58), wherein the tappet surface (50) is formed on an underside (52), which is directed towards the eccentric ring (30), of the bucket tappet (58).

In some embodiments, the tappet (44) has at least one tappet securing projection (62), which is arranged next to the tappet surface (50) and projects in the direction of the eccentric ring (30), for securing the pivoting bodies (46) on the tappet surface (50).

In some embodiments, the eccentric ring (30) has at least one eccentric ring securing projection (64), which is arranged next to the eccentric ring surface (38) and projects in the direction of the tappet (44), for securing the pivoting bodies (46) on the eccentric ring surface (38).

In some embodiments, exactly two pivoting bodies (46) are provided between the tappet surface (50) and the eccentric ring surface (38).

In some embodiments, a spring (40) is provided for permanent pretensioning of the tappet (44) and of the pivoting body (46) onto the eccentric ring (30).

BRIEF DESCRIPTION OF THE DRAWINGS

One embodiment of the present disclosure is explained in greater detail below on the basis of the enclosed drawings. In the drawings.

DETAILED DESCRIPTION

Figure 1:
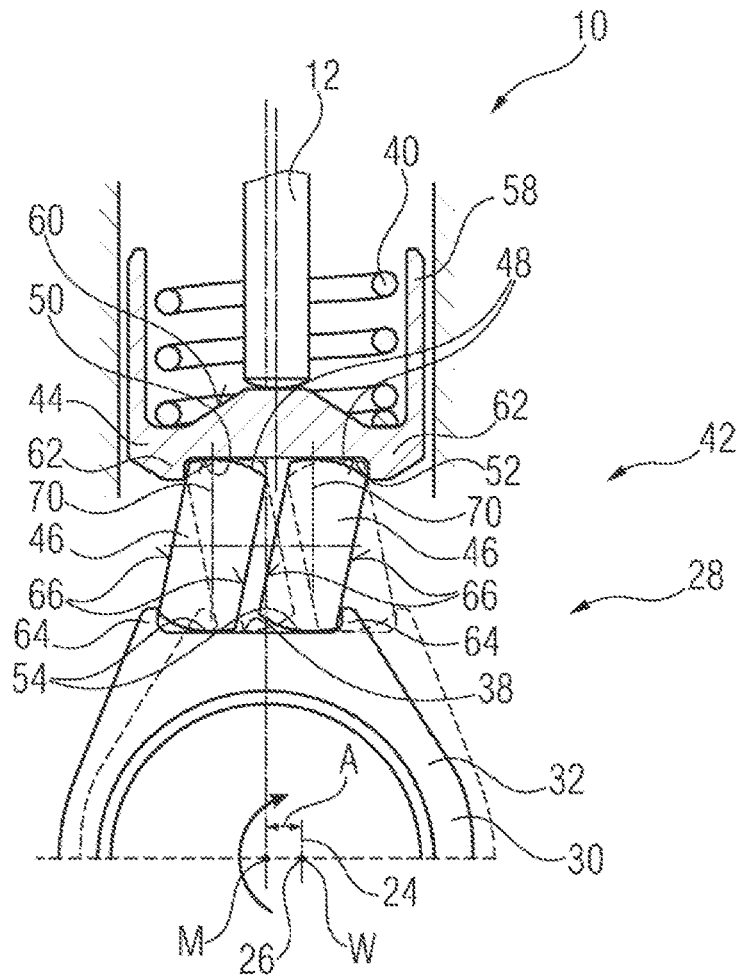
FIG. 1 shows a longitudinal sectional view of a drive device of a high-pressure fuel pump with two pivoting bodies.

A drive device for driving a high-pressure fuel pump of an internal combustion engine may include an eccentric ring which is in frictional connection with the drive shaft for converting a rotational movement of the drive shaft about a drive shaft rotational axis into a translational movement, wherein the eccentric ring has at least one flat eccentric ring surface. The drive device further comprises a tappet arranged spaced apart from the eccentric ring for passing on the translational movement from the eccentric ring, wherein the tappet has at least one flat tappet surface.

At least two pivoting bodies are additionally provided which are arranged between the eccentric ring surface and the tappet surface and are in contact with the eccentric ring surface and with the tappet surface. The pivoting bodies have in each case an extension axis running parallel to the drive shaft rotational axis, wherein the pivoting bodies are formed for pivoting about the extension axis.

With the drive device, a solution is accordingly proposed in the case of which an eccentric drive which uses an eccentric drive, to provide a very robust drive for a high-pressure fuel pump. The friction between the elements which drive a piston is reduced since no sliding friction, but rather a pivoting friction which corresponds to a rolling friction is present between the pivoting bodies and the eccentric ring surface or the pivoting bodies and the tappet surface.

Therefore, some embodiments include an eccentric drive which performs one piston stroke for each displacer per revolution of the drive shaft. The difference in comparison with the sliding shoe drive from the prior art lies in the fact that the transfer point is not formed as a sliding contact, rather as a rolling or pivoting contact. As a result, pure rolling or pivoting contact is generated with robust Hertzian contacts.

The provision of more than one pivoting body may generate a greater stability during driving of the piston.

The pivoting bodies may have a first contact surface in contact with the tappet surface and a second contact surface in contact with the eccentric ring surface, wherein the first and/or the second contact surface is formed to be arched about the extension axis.

In such embodiments, the pivoting bodies can always pivot about the extension axis. Both the first contact surface and the second contact surface may be formed to be arched.

In some embodiments, the first and/or the second contact surface is formed convexly about the extension axis. A curvature of the first and the second contact surface may be identical. As a result of this, a particularly low-friction movement of the pivoting bodies can be achieved at the tappet surface and at the eccentric ring surface.

In some embodiments, the pivoting bodies have at least one lateral surface arranged substantially perpendicular to the eccentric ring surface and the tappet surface, which lateral surface is formed, for example, to be flat. This at least one lateral surface can, however, have a constriction to save material and thus weight on the pivoting bodies. It is also alternatively or additionally possible to form this at least one lateral surface concavely which also contributes to the possibility of saving material.

An alternative convex formation of the at least one lateral surface may include the pivoting bodies formed to be more stable with regard to the forces acting in the high-pressure fuel pump than with a flat lateral surface or with a concave lateral surface. In some embodiments, the convexly formed lateral surface has a different curvature to the convexly formed first or second contact surface.

It is therefore possible to form the pivoting bodies in each case from a cylindrical rolling body, the outer diameter of which was maximized in order to achieve a minimal Hertzian contact voltage. Since, however, only a fraction of the circumference of the cylindrical rolling body is required for a working stroke, the lateral surfaces which have a curvature corresponding to the contact surfaces can be flattened in order to save material. The flattening can therefore lead, depending on the stability which is desired in the pivoting bodies, to a flat lateral surface or to a lateral surface with a constriction, wherein in both case concave or convex forms can be formed depending on whether one would like to save further material or increase stability.

The pivoting bodies may be formed in an elongated manner along an axis of the translational movement. In particular a length of the pivoting bodies along the axis of the translational movement lies in a range from 7 mm to 20 mm, in particular 14 mm to 18 mm. As a result of such a length of the pivoting bodies, a maximum outer diameter is produced at the curved contact surfaces, which results in a curvature of contact surfaces which enables a minimal Hertzian contact voltage.

The tappet may comprise a bucket tappet, wherein the tappet surface is formed on an underside, which is directed towards the eccentric ring, of the bucket tappet. Bucket tappets have the advantage over other tappets such as roller tappets or also mushroom-shaped pistons that they can very effectively absorb transverse forces which act during driving of the piston. When using a bucket tappet as a tappet, a robust drive device for driving the piston is therefore created.

The tappet may have at least one tappet securing projection arranged next to the tappet surface and projecting in the direction of the eccentric ring, for securing the pivoting bodies on the tappet surface. It is thus prevented that the pivoting bodies lose contact with the tappet surface during their movement triggered by transverse forces.

The eccentric ring may have at least one eccentric ring securing projection, which is arranged next to the eccentric ring surface and projects in the direction of the tappet, for securing the pivoting bodies on the eccentric ring surface. As a result of this, it is prevented that the pivoting bodies lose their contact with the eccentric ring surface as a result of active transverse forces.

In some embodiments, exactly two pivoting bodies are provided between the tappet surface and the eccentric ring surface. The provision of exactly two pivoting bodies may provide that the bearing on the tappet surface or the eccentric ring surface is not overdetermined, rather is statically clearly determined.

A spring may provide permanent pretensioning of the tappet and of the pivoting bodies onto the eccentric ring. The pretensioning of the spring may be configured so that it on one hand keeps the pivoting bodies in close contact with the tappet surface and the eccentric ring surface, but on the other hand enables a pivoting movement of the pivoting bodies.

With the drive device, an eccentric drive is proposed which is embodied to be energetically optimized since it requires less frictional power and as a result lower $CO_2$ emissions are produced. A robust rolling or pivoting contact is proposed by means of a maximal embodiment of the contact radii and as a result of a statically clear determination in the case of which even small diameter differences can be tolerated.

For example, the pivoting bodies can be produced in that cylindrical rolling bodies are laterally flattened in order thus to be able to combine a maximum energy efficiency with robustness. Instead of the flat section, concave or convex forms can also be provided at the side surface(s) of the pivoting bodies.

Figure 3:
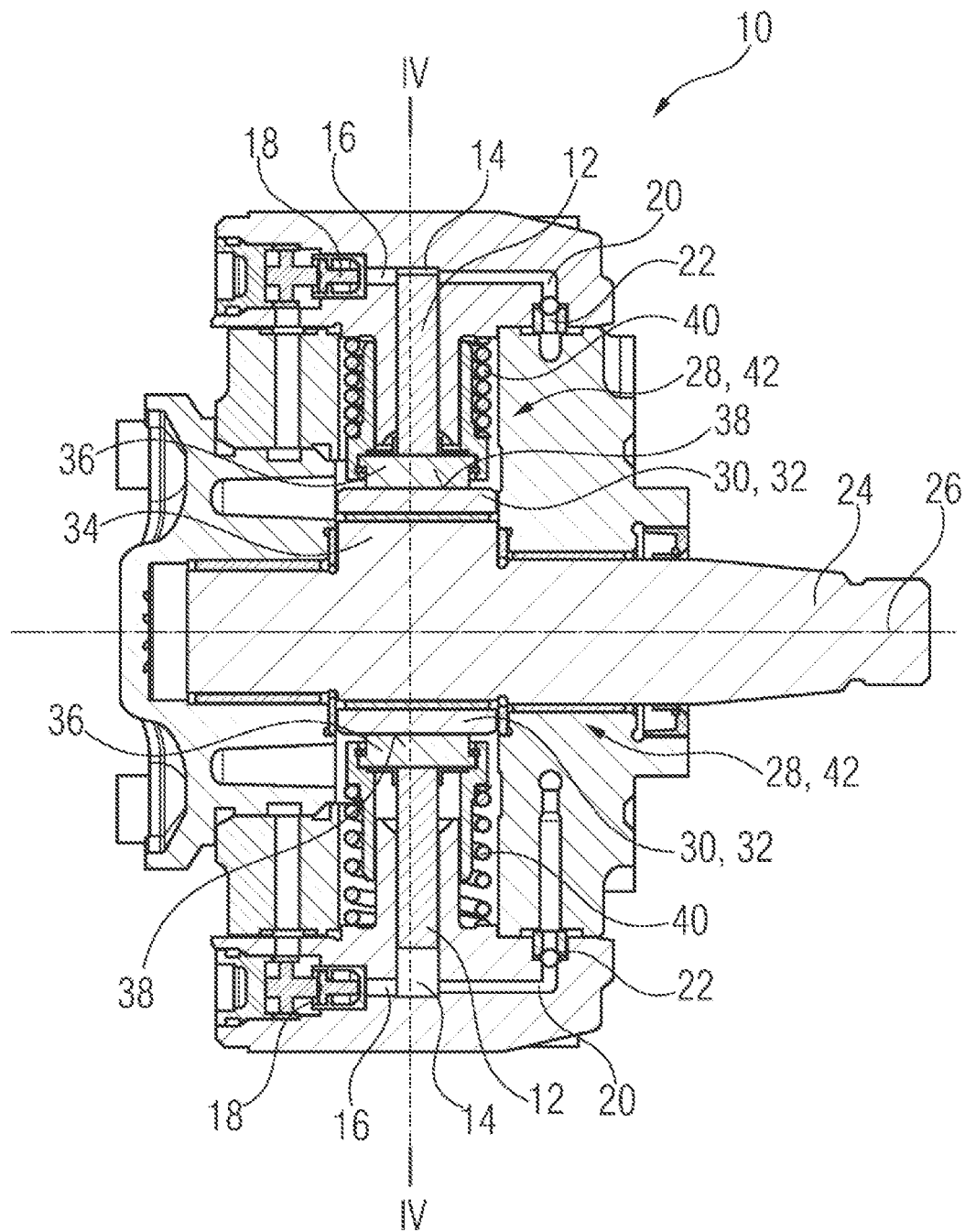
FIG. 3 shows a longitudinal sectional view of a high-pressure fuel pump from the prior art with an eccentric drive.
Figure 4:
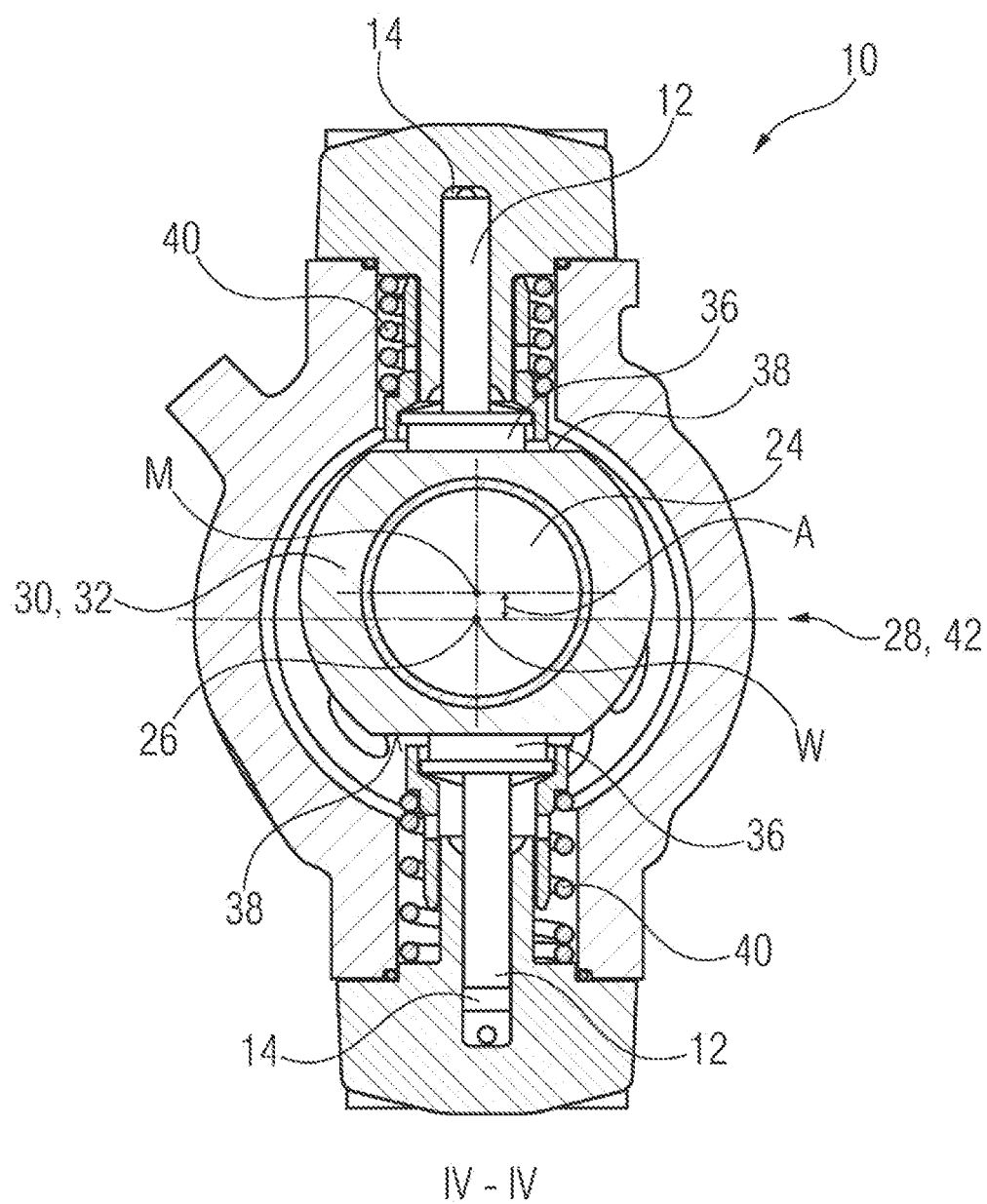
FIG. 4 shows a sectional view through line IV-IV from FIG. 3.

The fundamental structure of a high-pressure fuel pump 10 which has an eccentric drive 28 has already been explained in the context of high-pressure fuel pumps 10 from the prior art represented in FIG. 3 and FIG. 4. The fundamental structure and the mode of operation of high-pressure fuel pump 10 according to the teachings of the present disclosure corresponds to these high-pressure fuel pumps 10 known from the prior art in which an eccentric ring 30 is used, but has, as is described below, an improved structure of entire drive device 42 as such. FIG. 1 therefore shows a longitudinal sectional view of a sub-region of the high-pressure fuel pump in the region of drive device 42.

Drive device 42 has a drive shaft 24, an eccentric ring 30, a tappet 44 and two pivoting bodies 46. Instead, more than two pivoting bodies 46 can also be provided which can lead, however, to a statically overdetermined contact.

Eccentric ring 30 is moved up and down by drive shaft 24, in particular a cam 34, not shown, during a rotational movement of drive shaft 24 about its drive shaft rotational axis 26, as a result of which a translational movement is generated which is passed on to a piston 12 of high-pressure fuel pump 10. In order to be able to pass on this translational movement to piston 12, a transmission mechanism is provided which comprises pivoting bodies 46 and tappet 44. Pivoting bodies 46 are thereby in contact by means of a first contact surface 48 with a tappet surface 50 which is also formed to be flat and is located on an underside 52 of tappet 44 directed towards eccentric ring 30. On the opposite side, pivoting bodies 46 are in contact by means of a second contact surface 54 with an eccentric ring surface 38 which is arranged on eccentric ring 30 directed towards tappet 44.

Pivoting bodies 46 have in each case an extension axis 56 running parallel to drive shaft rotational axis 26 and projecting in the drawing plane in FIG. 1. Pivoting bodies 46 can pivot about this extension axis 56 when eccentric ring 30 is moved by drive shaft 24.

Pivoting bodies 46 are represented in FIG. 1 in continuous lines in a position when eccentric ring 30 moves towards an upper dead center, while the dashed representation of pivoting bodies 56 represents a situation in which eccentric ring 30 again moves away from the upper dead center.

In order to achieve good stability of drive device 42 without overdetermination, two pivoting bodies 46 are arranged between tappet surface 50 and eccentric ring surface 38.

So that pivoting bodies 46 are permanently in contact with tappet surface 50 and eccentric ring surface 38, a spring 40 is provided which pretensions tappet 44 and pivoting bodies 46 onto eccentric ring 30.

Tappet 44 is embodied as bucket tappet 58 which has the advantage that it is good at absorbing transverse forces and can counteract them with a resistance force. At the same time, an inner surface 60 of bucket tappet 58 can serve as a spring plate for supporting spring 40 as well as a bearing surface for piston 12.

Both first contact surface 48 and second contact surface 54 of pivoting bodies 46 are formed to be arched, and indeed preferably convexly arched about extension axis 56. Here, the curvature of first contact surface 48 and second contact surface 54 is identical. As a result, pivoting bodies 46 can pivot about extension axis 56 with only small friction losses in contact with eccentric ring surface 38 and tappet surface 50 during the movement of eccentric ring 30.

Tappet 44 and eccentric ring 30 have in addition to tappet surface 50 or eccentric ring surface 38 in each case projections, namely a tappet securing projection 62 or an eccentric ring securing projection 64. Said securing projections 62, 64 ensure that during operation pivoting bodies 46 cannot slip away or break away from eccentric ring surface 38 or tappet surface 50 and as a result lose contact with tappet surface 50 or eccentric ring surface 38.

Figure 2:
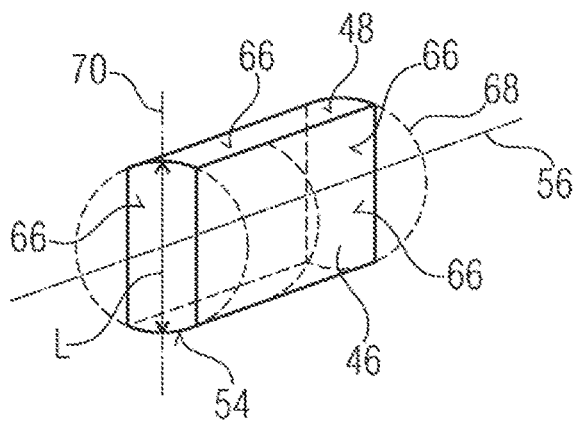
FIG. 2 shows a perspective view of one of the two pivoting bodies from FIG. 1.

FIG. 2 shows a perspective view of one of pivoting bodies 46. Pivoting body 46 has lateral surfaces 66 arranged perpendicular to eccentric ring surface 38 or tappet surface 50 and thus also substantially perpendicular to contact surfaces 46, 54. In the embodiment shown in FIG. 2, these lateral surfaces 66 are formed to be flat. It is, however, also possible to provide lateral surfaces 66 with a constriction in order to thus save material and thus weight on pivoting body 46. In order to achieve this purpose, it is also possible to form lateral surfaces 66 to be concave. A convex formation of lateral surfaces 66 is also possible, wherein, however, the curvature of convex lateral surfaces 66 is preferably different to the curvature of contact surfaces 48, 54.

As is further apparent from FIG. 2, pivoting bodies 46 can be formed from a rolling body 68 which is indicated by a dashed line. To this end, the lateral surfaces are formed by removal of the lateral material of rolling body 68. A rolling body 68 was previously provided which has as large an outer diameter as possible in order to thus largely minimize the Hertzian contact voltage in the region in which pivoting body 46 to be generated later comes into contact with eccentric ring surface 38 or tappet surface 50.

A length L of pivoting body 46 formed from rolling body 68 is therefore produced along an axis 70 of the translational movement which lies in a range from 14 mm to 18 mm, in particular between 15.5 mm and 16.5 mm.

Drive device 42 or a high-pressure fuel pump 10, which is fitted with such a drive device 42, which uses an eccentric drive 30 can be used, wherein, however, sliding friction, which normally occurs between a sliding shoe 36 and eccentric ring surface 38, can be reduced in comparison to a rolling/pivoting friction as a result of the pivoting of pivoting body (bodies) 46 about extension axis 56. As a result, a low coefficient of friction similar to the use of roller tappets can be achieved with rolling bodies which actually rotate about an axis, wherein, however, a robust eccentric ring 30 is used.

LIST OF REFERENCE SIGNS

10 High-pressure fuel pump
12 Piston
14 Pressure chamber
16 Intake
18 First valve
20 Outlet
22 Second valve
24 Drive shaft
26 Drive shaft rotational axis
28 Eccentric drive
30 Eccentric ring
34 Cam
36 Sliding shoe
38 Eccentric ring surface
40 Spring
42 Drive device
44 Tappet
46 Pivoting body
48 First contact surface
50 Tappet surface
52 Underside
54 Second contact surface
56 Extension axis
58 Bucket tappet
60 Inner surface
62 Tappet securing projection
64 Eccentric ring securing projection
66 Lateral surface
68 Rolling body
70 Axis
A Distance
L Length
M Center point eccentric ring
W Shaft center point

What is claimed is:

1. A drive device a high-pressure fuel pump of an internal combustion engine, the drive device comprising:
    an eccentric ring in frictional connection with a drive shaft for converting a rotational movement of the drive shaft about a drive shaft rotational axis into a translational movement;
    wherein the eccentric ring includes at least one flat eccentric ring surface;
    a tappet spaced apart from the eccentric ring for passing on the translational movement from the eccentric ring;
    wherein the tappet includes at least one flat tappet surface; and
    at least two pivoting bodies disposed between the eccentric ring surface and the tappet surface and in contact with the eccentric ring surface and with the tappet surface;
    wherein the pivoting bodies each include a respective extension axis running parallel to the drive shaft rotational axis;
    wherein the pivoting bodies pivot about the extension axis.

2. The drive device as claimed in claim 1, wherein the pivoting bodies each include a respective first contact surface in contact with the tappet surface and a second contact surface in contact with the eccentric ring surface, wherein the first or the second contact surface is arched about the extension axis.

3. The drive device as claimed in claim 2, wherein the first or the second contact surface is convexly arched about the extension axis.

4. The drive device as claimed in claim 1, wherein the pivoting bodies each include at least one respective lateral surface substantially perpendicular to the eccentric ring surface and the tappet surface, and wherein the at least one respective lateral surface convex, wherein the convex lateral surface has a different curvature to a convex first or second contact surface.

5. The drive device as claimed in claim 1, wherein:
    the pivoting bodies include an elongation along an axis of the translational movement, and
    a length of the pivoting bodies along the axis of the translational movement lies in a range from 7 mm to 20 mm.

6. The drive device as claimed in claim 1, wherein:
    the tappet comprises a bucket tappet, and
    the tappet surface is formed on an underside of the bucket tappet, the underside directed towards the eccentric ring.

7. The drive device (42) as claimed in claim 1, wherein the tappet includes at least one tappet securing projection arranged next to the tappet surface and projecting in the direction of the eccentric ring, for securing the pivoting bodies on the tappet surface.

8. The drive device as claimed in claim 1, wherein the eccentric ring includes at least one eccentric ring securing projection arranged next to the eccentric ring surface and projecting in the direction of the tappet for securing the pivoting bodies on the eccentric ring surface.

9. The drive device as claimed in claim 1, further comprising exactly two pivoting bodies disposed between the tappet surface and the eccentric ring surface.

10. The drive device as claimed in claim 1, further comprising a spring for permanent pretensioning of the tappet and of the pivoting body onto the eccentric ring.

* * * * *